(No Model.)

H. CASLER.
CAMERA.

No. 517,539. Patented Apr. 3, 1894.

WITNESSES:
H. A. Carhart,
Chas. W. Marvin.

INVENTOR
Herman Casler,
BY Smith & Denison
ATTORNEYS.

THE NATIONAL LITHOGRAPHING COMPANY,
WASHINGTON, D. C.

UNITED STATES PATENT OFFICE.

HERMAN CASLER, OF SYRACUSE, ASSIGNOR OF ONE-HALF TO HARRY N. MARVIN, OF SCHENECTADY, NEW YORK.

CAMERA.

SPECIFICATION forming part of Letters Patent No. 517,539, dated April 3, 1894.

Original application filed March 1, 1893, Serial No. 464,161. Divided and this application filed August 4, 1893. Serial No. 482,379. (No model.)

*To all whom it may concern:*

Be it known that I, HERMAN CASLER, of Syracuse, in the county of Onondaga, in the State of New York, have invented new and useful Improvements in Cameras, of which the following, taken in connection with the accompanying drawings, is a full, clear, and exact description.

This invention relates to improvements in cameras, more particularly to the class styled "detective" cameras; and it consists in the novel construction and arrangement of the various parts as will be hereinafter described and set forth in the claims.

The principal object of the invention is to produce a case, for the class of cameras above named, which shall permit of a quick and ready adjustment or resetting of the shutter, after each exposure, and the bringing of a new portion of the film under the exposure-opening in the base which supports the shutter mechanism.

The present invention is especially designed for the shutter and its operating mechanism described and illustrated in an application filed by me March 1, 1893, Serial No. 464,161, of which the present application is a division.

The object above mentioned is attained by the mechanism illustrated in the accompanying drawings, in which—

Figure 2:
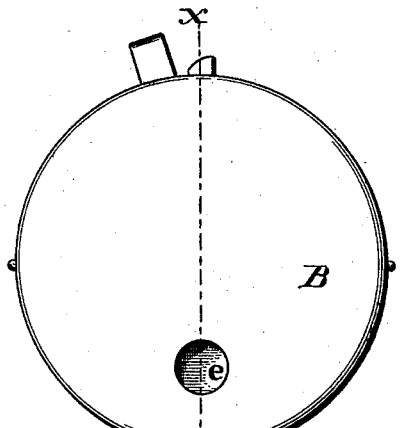
Figure 1:
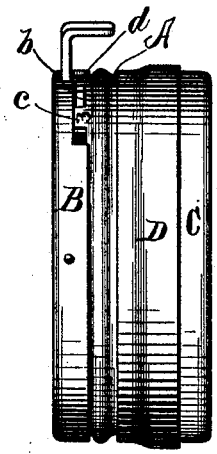
Figure 4:
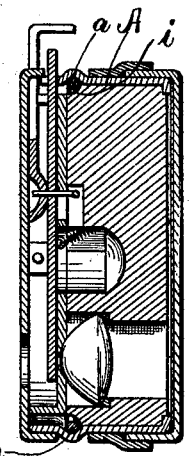
Figure 5:
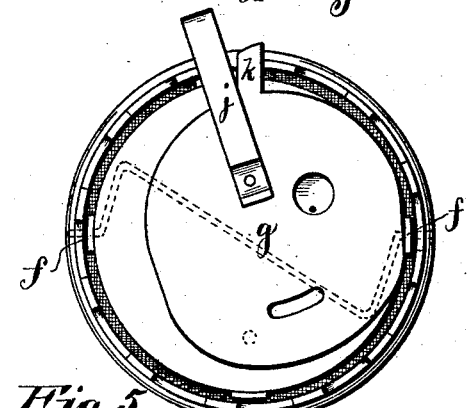
Figure 6:
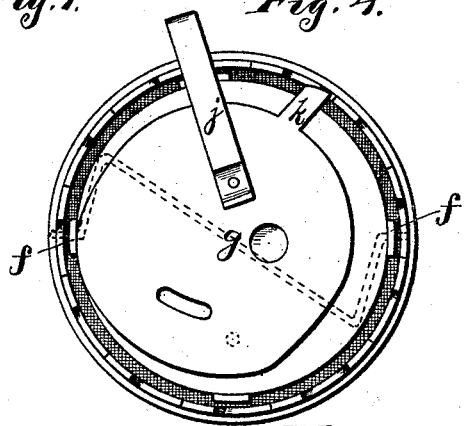
Figure 7:
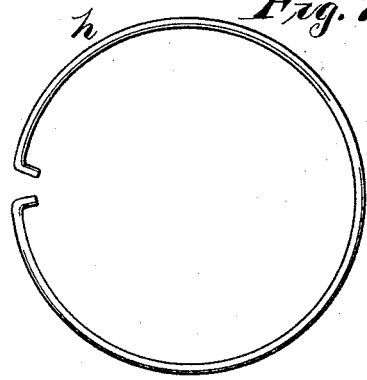
Figure 3:
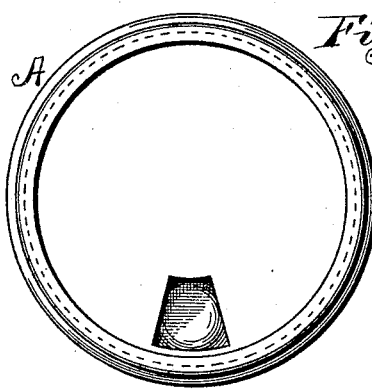

Figure 1 represents an edge view of the case complete; Fig. 2, a front view thereof; Fig. 3, a rear view, with the cover removed; Fig. 4, a sectional view on line $x\ x$ of Fig. 2 showing the interior parts of a camera; Fig. 5, a front view of the interior of a camera, showing the parts in position as they appear before exposure, the cover being removed; Fig. 6, a similar view, showing the parts as they apppear after exposure, and Fig. 7, a view of the spring or packing inserted between the camera base or body and the interior face of the shell, for the purpose of holding the base or body firmly within the shell under tension.

Referring to the drawings: the letter A indicates a shell or casing having its face or side formed with an annular groove, $a$, and around one of its edges arranged, at regular intervals, a series of open-slots or notches, $b$, and a series of projections, $c$, each slot or notch alternating with a projection. The other edge of the shell or casing is turned inwardly to form an annular flange, as shown, which serves as a seat for the base or body to which the shutter mechanism of the camera is attached. The projections are numbered consecutively, and the film divided into as many parts as there are numbered projections.

B indicates the front cover or cap, which is provided in its flange part with a compound notch or recess, $d$, through one of which recesses projects the shutter operating-lever $j$, and in the other operates a lug, $k$, of said shutter. Said cover or cap is also provided in its face with an exposure-opening $e$.

C indicates the rear cover, which is flanged to fit the flanged edge of the shell or casing.

A′ indicates the bases or support for the shutter-mechanism and is confined within the shell or casing by means of a spring or rubber packing-ring, H, which is seated partly in the annular groove $a$ and partly in a slight annular groove $i$, made at the front peripheral edge of the base or support. It should be understood that said base or support is made to fit loosely within the shell and by use of the packing-ring a friction is created between the base or support and the interior of the shell or casing. Attached to the front of the base or support is a plate, $p$, provided, at diametrically opposite sides, with lugs or ears $f$, which are provided with suitable apertures, and the flange of the front cover is correspondingly apertured. The respective ends of a Z-shape spring, $g$, pass through said apertured flange and lug or ear, securing the said cap and base together.

The letter D indicates a band, preferably made of rubber covering the joint where the rear cover overlaps the shell or casing, and said band serves to exclude the light from the interior of the camera, and affords a firm grasping surface for the hand in manipulating the camera to reset the shutter-mechanism.

For the purpose of describing the operation of the present invention, I have shown in connection therewith the shutter-mechanism described and illustrated in my application hereinbefore alluded to.

The operation is as follows: The camera being placed in position to photograph the desired object, the lever $j$ is pressed by the thumb until it forces the lug $k$ out of engagement with its recess or notch, when the shutter will be thrown over, as shown in Fig. 6, and in its travel the exposure will be made. To reset the shutter for another exposure, the camera is held in one hand with the thumb and fingers firmly grasping the shell and rear cover, and with the other hand the front cover is rotated until the lug $k$ is checked by the lug shown by dotted lines under the lever $j$.

Having thus fully described my invention, what I claim is—

1. A camera comprising a circular base, a lens seated therein and an eccentrically-pivoted plate provided with a lug on one side adapted to engage with the recesses in the shell and having an exposing slotway adapted to travel in a circuitous direction in making an exposure.

2. A camera comprising a circular base, a lens seated therein, an eccentrically-pivoted plate provided with a lug on one side adapted to engage with the recesses in the case and having an exposing slotway and means for causing said eccentrically-pivoted plate to travel in a circuitous direction in making an exposure.

3. A camera comprising a circular base, a lens seated therein, an eccentrically pivoted plate provided with a lug on one side to engage with the recesses in the shell or case and a wire band adapted to be seated in the front edge of the base for the purpose of securing said base within the shell.

4. In a camera-case, the combination, with a base or support for the shutter-mechanism, of a shell or casing formed with an annular groove in its inner face, a spring-packing seated partly in said groove and partly in a similar groove in said base, and a front and rear cover as described.

5. A camera-case, comprising a circular shell, a base or support for the shutter-mechanism seated in said shell, and lens seated in said base or support, a front cover provided with an exposure opening and a rear cover inclosing the film chamber.

6. In a camera, the combination, with the base adapted to support a shutter-mechanism, of a shell or casing having one of its edges provided with alternating slots and projections, a front cap or cover connected with said base, indicating marks on the said projections, whereby the relative positions of the lens and plate or film may be determined, and a rear cover for the film chamber, substantially as specified.

In witness whereof I have hereunto set my hand.

HERMAN CASLER.

In presence of—
HERBERT A. CARHART,
HOWARD P. DENISON.